March 16, 1954 J. E. HATFIELD 2,672,309
PARACHUTE HARNESS AND COUPLER THEREFOR
Filed Feb. 14, 1952 3 Sheets-Sheet 1
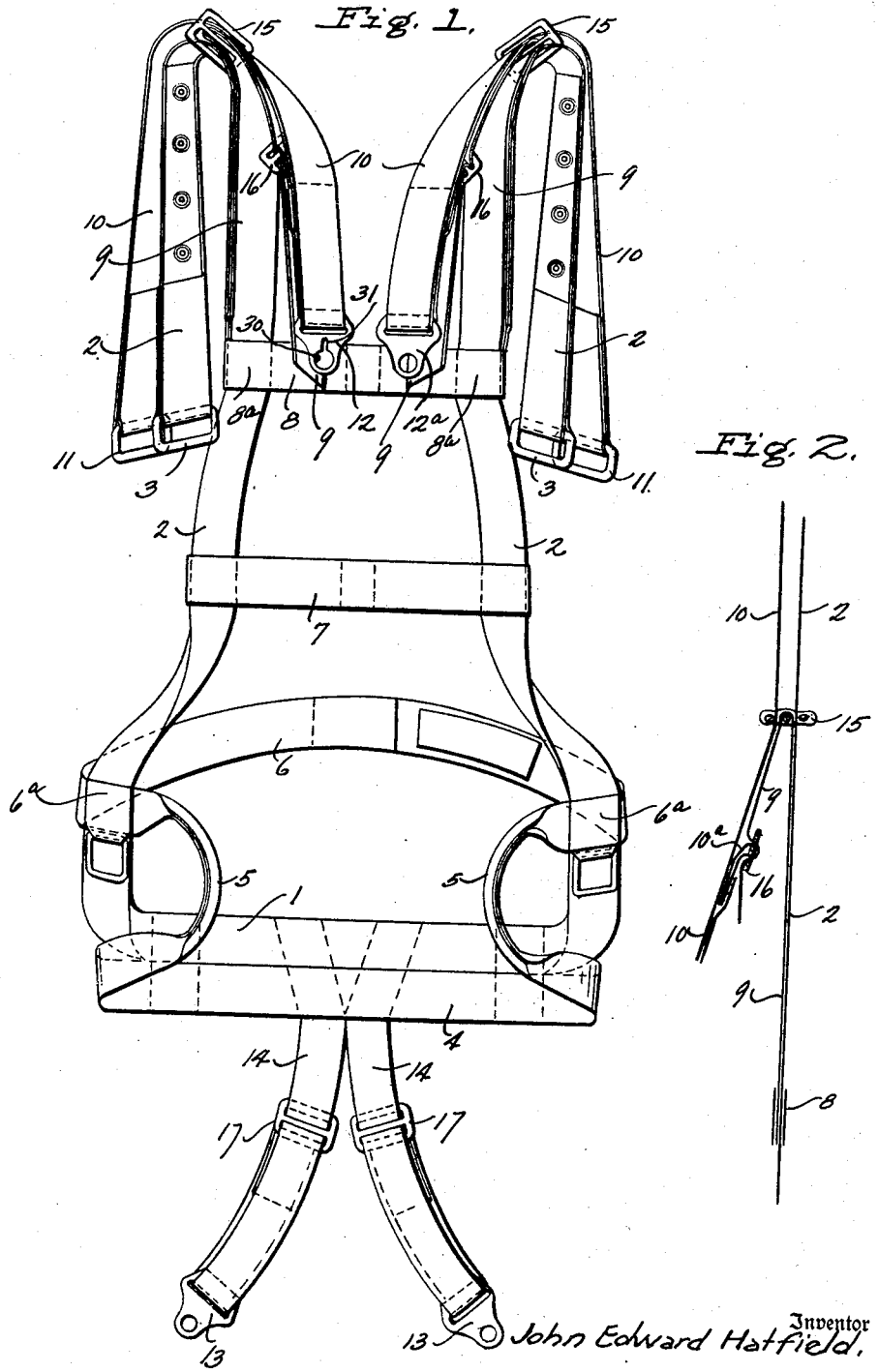
Inventor
John Edward Hatfield,
By
Attorneys

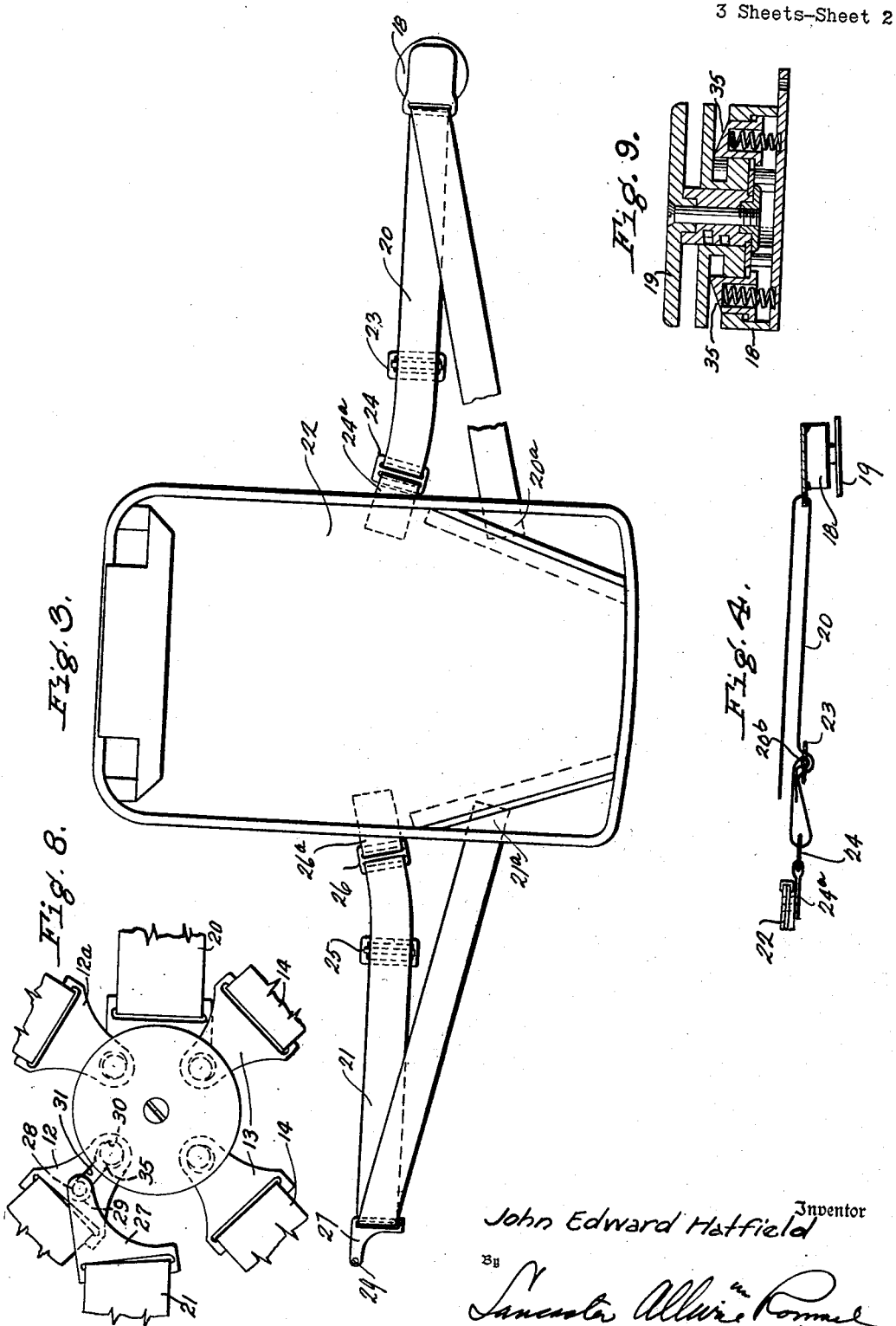

March 16, 1954 J. E. HATFIELD 2,672,309
PARACHUTE HARNESS AND COUPLER THEREFOR
Filed Feb. 14, 1952 3 Sheets-Sheet 3
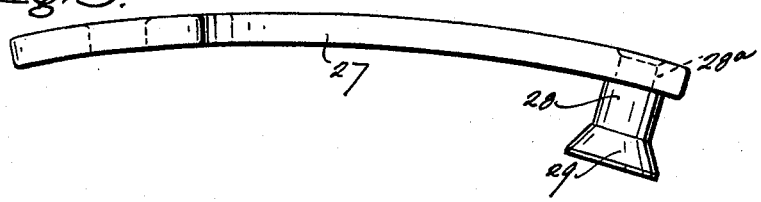
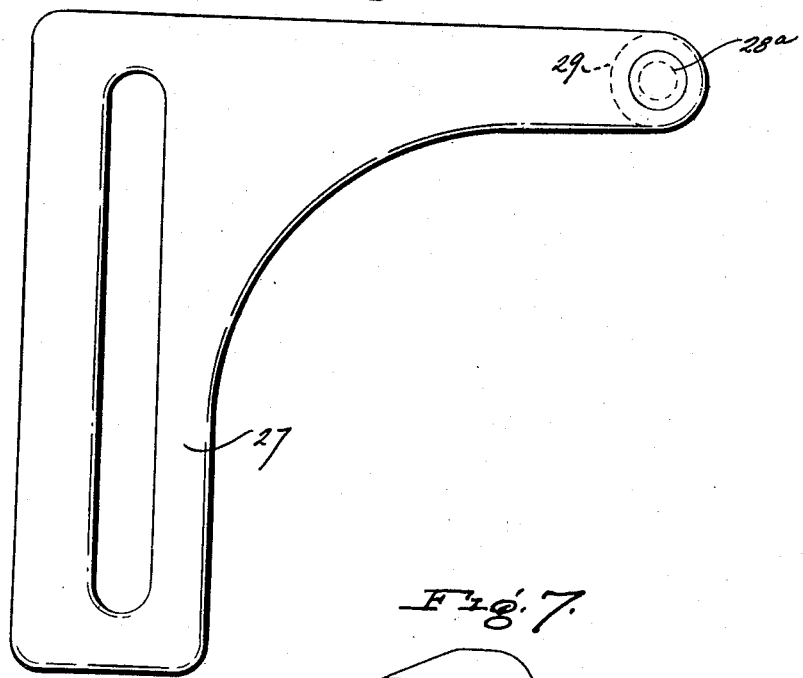
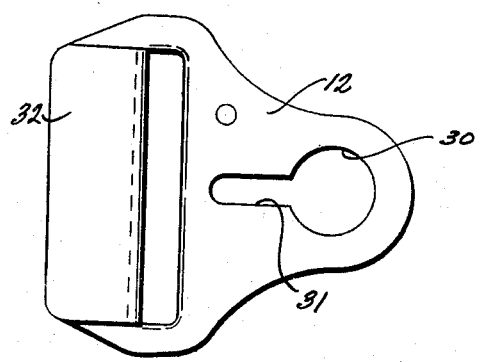
John Edward Hatfield Inventor
By Lancaster, Allwine Rommel
Attorneys Patented Mar. 16, 1954

2,672,309

UNITED STATES PATENT OFFICE 2,672,309

PARACHUTE HARNESS AND COUPLING THEREFOR

John Edward Hatfield, Stotfold, England, assignor to Irving Air Chute Company, Inc., Buffalo, N. Y., a corporation of New York Application February 14, 1952, Serial No. 271,626

Claims priority, application Great Britain February 16, 1951

9 Claims. (Cl. 244—151)

This invention is concerned with improvements in or relating to connector devices, and more particularly though not necessarily connector devices for releasably interconnecting the free ends of a parachute harness.

As is well known, it is desirable to enable a parachutist to release himself very quickly from his harness in certain circumstances, and for this purpose it is common practice to provide a so-called "quick release coupling box" usually located on the chest of the harness wearer and serving releasably to interconnect the ends of the straps of the harness. Such quick release boxes usually provide for the interconnection of four strap ends, e. g. the ends of two leg straps and the ends of two straps extending downwardly from the wearer's shoulders. It does however sometimes become desirable to provide for the releasable connection of other strap ends, e. g. the ends of a waist strap or the ends of a strap carrying the pack for association with the said harness. There are quick release boxes having means for engaging the eyeletted ends of more than four strap ends, such as shown in U. S. Patent 2,556,923, but under such circumstances the weight and dimensions of the box are proportionally increased and to some extent objectionable for use on parachute equipment.

One of the objects of the present invention is to provide a connector device having provision whereby additional strap ends (more than four) can be releasably connected without objectionably increasing the weight and/or overall dimensions of such device.

According to the present invention there is provided a connector device comprising at least two connector parts (hereinafter called "principal connector parts") of which at least one is releasably engageable with at least one other connector part (hereinafter called a "subsidiary connector part") in such a way that the latter cannot be disengaged therefrom when the said principal connector part is engaged with another one, but is free for disengagement when said principal connector parts are disengaged.

One of the above mentioned principal connector parts may constitute the body of the connector device and include one or more spring-actuated latches, plungers or the like for engaging the other principal connector part or parts, the last mentioned part being for instance in the form of an eyeletted lug secured to or adapted to be secured to one of the strap ends or other elements to be interconnected.

The aforesaid subsidiary connector part or each of such parts may be in the form of a lug having one or more slots for engaging one or more harness straps or other elements to be interconnected and the means for enabling such part to be releasably coupled to the associated principal connector part may comprise a key-hole type of connection including a stud projecting from the subsidiary connector part and a receiving slot in the associated principal connector part; the said stud having an enlarged head and the said slot having a correspondingly enlarged portion at one end so that the stud can be passed through the slot when the stud is located at the enlarged end of the slot but is trapped when the stud is drawn into the narrower part of the slot, the arrangement being such that when the two principal connnector parts are interconnnected the enlarged end of the slot is wholly or partially covered or obstructed and the disengagement of the subsidiary connector part is accordingly prevented. If desired the said enlarged end of the slot may constitute an eyelet for engagement by a movable plunger, latch or the like on the principal connector part with which direct releasable engagement is desired.

It will of course be understood that a device constructed in accordance with the present invention may include any desired number of principal connector parts and any desired number of subsidiary connector parts. Thus, for instance, the device may comprise a connector body adapted to make releasable connection with say four principal connector lugs or the like and all of said connnector lugs or the like or any required number thereof may be adapted to be releasably engaged by one or more subsidiary connector lugs or the like.

In the application of the present invention to a quick release coupling box for a parachute harness the abovementioned principal connector parts are preferably adapted for connection to the load-bearing straps of the harness whilst the subsidiary connector parts are preferably adapted for connection to other straps of the equipment, such for instance as a strap employed for securing a parachute pack to the parachutist or a non load-bearing safety strap of the harness, such as a waist strap.

In order that the present invention may be well understood, by way of example only, one embodiment thereof will now be described, in application to quick-release mechanism for parachute equipment, and reference will be made to the accompanying drawings in which:

Figure 1 is a front elevation of an opened-out quickly releasable parachute harness, Figure 2 is a diagrammatic side elevation of a detail of the harness shown in Figure 1, Figure 3 is a front elevation of a parachute pack assembly provided with a securing strap having connector parts for association with the connnector parts on the free ends of the parachute harness shown in Figure 1, Figure 4 is a diagrammatic plan view of a detail of the pack assembly shown in Figure 3, Figure 5 is a side elevation of the part shown in Figure 6, Figure 6 is an enlarged front elevation of one of the connector or fastener parts carried by the pack belt, and Figure 7 is an enlarged front elevation of one of the connector or fastener parts fitted to the parachute harness.

Fig. 8 shows, in front view, an assembly of the connector parts, including the subsidiary connector part, upon the coupling.

Fig. 9 is a sectional view of the type of coupling used with the connector parts, as shown in U. S. Patent 1,842,611.

Referring to the drawings, the parachute harness includes a U-shaped swing in which the parachutist in descent usually sits as in a swing, comprising a seat strap 1 and uprising main lift webs 2, 2, terminating in D-rings 3, 3 for connection to the shroud lines (not shown) of a parachute. Adjacent to the seat strap 1, and secured thereto, is a subsidiary seat strap 4, the ends of which terminate in side leg strap receiving loops 5, 5, and a back strap 6 connected at 6ª, either fixedly or slidably attached to webs 2, 2. Centre and upper back straps 7 and 8 extend between the main lift webs 2, and from connecting points 8ª adjacent to the ends of the upper back strap 8, there extend two shoulder straps 9, 9; the forward ends being connected in a manner hereinafter described to two front lift webs 10, 10. The said front lift webs terminate at the far ends in D-rings 11, 11 for connection to the shroud lines of a parachute, and the opposite ends of such front lift webs 10, 10 are provided with connector lugs 12 and 12ª which are adapted to be releasably coupled to connector lugs 13, 13 provided at the ends of leg straps 14, 14 extending from the seat straps 1, 4 of the harness by means of a quick release coupling box.

The above mentioned main lift webs 2, 2, and front lift webs 10, 10 of the harness pass in pairs through three-bar adaptors 15, 15 disposed adjacent to the shoulder portions of the harness (see Fig. 2), the centre bar of each adaptor serving to separate the lift webs of the pair concerned, and the associated shoulder strap is passed around the said centre bar and thence slidably through a three-bar shoulder adjustment adaptor 16. The free ends of the shoulder straps 9, 9 can accordingly be pulled through the adaptors 16, 16 for the purpose of adjusting the shoulder straps to accommodate wearers of various sizes, and pursuant to such adjustment the adaptors 15 which interconnect these parts of the lift webs which extend to the parachute are simultaneously caused to become appropriately located on the harness wearer. The free end of the straps 10, 10, at 10ª, are preferably fixedly connected to the centre bars of the adaptors 16, 16, as shown in Fig. 2.

When the harness is being applied to a wearer, the leg straps 14, 14 are passed through the side loops 5, 5, before the lugs 13, 13 are coupled to the lugs 12, 12ª by means of the coupling box, and in order to afford comfortable accommodation for wearers of various sizes the said leg straps are preferably of adjustable length. Thus, for instance, the said leg straps may pass through slots in the lugs 13, 13 and the ends may be connected to adaptors 17, 17 slidable on the body portions of such leg straps.

The aforesaid lugs 13, 13 and 12, 12ª are adapted to be releasably interconnected by a quick-release coupling box 18, such box preferably being of any suitable kind well known in the art, such for instance as shown and described in U. S. Patents 1,842,611 and 1,899,656. Such coupling boxes have movable plungers or detents 35 for engagement with the eyeletted ends of harness lugs or fasteners; the release of such plungers being effected by the turning and depression of a control hub structure and disc 19.

The said quick release box 18 is carried by one part 20 of a two-part belt 20, 21 extending from a parachute pack 22. The part 20 of the said belt is stitched at one end 20ª to the pack and after slidably passing through a slot in the base of the quick-release box it passes through the slots of a three-bar roller buckle 23; thence through the adjacent slot of a three-bar adaptor 24, and the end is then secured at 20ᵇ to the centre bar of the buckle 23. In this way the length of the part 20 of the belt can easily be adjusted by appropriately moving the buckle 23. The adaptor 24 is secured to a strap tab 24ª which is sewn to the pack container. Similarly the part 21 of the belt is fixed at one end 21ª to the pack and passes through the slots of a roller buckle 25 in manner similar to buckle 23. An adaptor 26 is secured by a strap tab 26ª to the pack container and the strap 21 is threaded through the slot of this adaptor. Said part 21 is also passed through the slot of a subsidiary connector part 27 which is adapted to make releasable engagement with the connector part 12 on the harness in such a manner that disengagement is permitted when the said harness connector part is itself disengaged with respect to the box 18, but prevented from release when the last mentioned connector part is held by the box. For this purpose the said subsidiary connector part 27 is provided with a projecting stud 28 having an enlarged head 29. The harness lug 12, as shown in Figure 1, and in greater detail in Figure 7, has an opening 30 communicating with a radial slot 31. The diameter of opening 30 is such as to permit the passage therethrough of the head 29 of the stud 28, and the width of the slot 31 is sufficient to permit the stem of the stud to slide therein whilst preventing the head 29 from passing therethrough. This provides in the fastener part 12 a keyhole type opening and the parts 12 and 27 have a sort of bayonet type joint connection. The opening 30 also constitutes the eyelet for engagement by a plunger or detent of the quick-release box 18, but it is to be understood that a separate eyelet may be provided for engagement by such plunger providing that the arrangement is always such that when the plunger is in engagement with such additional eyelet the opening 30 is not sufficiently exposed for the head 29 of the stud to pass therethrough.

In order to promote ready sliding movements of the associated harness straps through the connector lugs 12, 12ª and 13, 13, U-shaped slider plates, such as the plate 32 shown in Figure 7, may be fitted to such lugs through the strap slots. Also to promote free movement of the stud 28 in the slot 31 of the lug 12 the said stud may be rotatably mounted upon pin 28a attached to part 27.

When the above described equipment is to be fitted to a wearer the part 20 of the pack belt is drawn around the user's waist. The unslotted lug 12a is snapped in usual manner into engagement with the quick-release box 18; the leg straps 14, 14 are drawn between the wearer's legs and after being passed through the associated loops 5, 5, they are coupled to the quick-release box in usual manner by means of the lugs 13, 13. The stud on the subsidiary connector part 27 is then entered into the opening 30 and slid into the slot 31 of the slotted lug 12 whereupon the lug 12 is also snapped into engagement in usual manner with the respective detent of quick-release box 18. This positioning of the lug 12 will cover the opening 30 by the casing of the box and all that extends beyond the periphery of the box will be the outer lug portion having the slot 31 therein. All of the free ends of the harness straps are thus interconnected directly by the quick release box engaging the lugs 12, 12a and 13, 13 and the pack is secured upon the wearer by the belt, one end being fixed to the said quick-release box 18 and the other end being connected to the slotted lug 12 by means of the subsidiary connector part 27. After securing the equipment in this manner, any necessary tightening of the straps can be effected, i. e. the leg straps can be adjusted by means of the adaptors 17, 17; the belt can be adjusted by the roller buckles 23, 25, and the shoulder straps can be adjusted by means of the adaptors 16, 16.

When a user wishes to free himself from the equipment he only has to operate the quick-release box 18, by turning and depressing disc 19 whereupon the belt part 20, the leg straps 14, 14 and the front lift web 10 carrying the unslotted lug 12a become completely free with respect to each other, and the front lift web having the slotted lug 12 together with the engaged connector part 27 also become freed from the quick-release box and thereupon the said part 27 is freed for easy movement out of engagement with the said lug.

In a modification of the above described equipment both of the lugs 12, 12a fitted to the front lift webs may be key hole slotted, and both ends of the pack belt may be provided with connector parts similar to the connector part 27, i. e. the belt may be entirely independent of the quick-release box. In such an arrangement the quick-release box may also be entirely independent of the harness, i. e. connector lugs similar to those already described may be fitted to all of the free ends of the harness straps or the said box may be secured to any strap end fitting in substitution for the unslotted lug 12a above described.

There may be any number of principal connector parts and any or all of such principal connector parts may be adapted to be engaged by subsidiary connector parts. Moreover such subsidiary connector part, or each of such subsidiary connector parts may be coupled to two or more straps. In the case, for example, where it is desired to provide for two straps to be coupled to a subsidiary connector part, the latter may be of Y-shape; the stud for engagement with a slotted lug being located near the end of the tail of the said part and slots for receiving two straps being provided near the ends of the arms of the said Y-shaped part.

Various changes may be made to the forms of the invention herein shown and described without departing from the spirit of the invention or scope of the claims.

I claim:

1. In a strap connecting device for parachute harnesses and the like the combination of a parachute harness having a plurality of straps provided with connector parts, a quick connector coupling having connector part detents with means for releasably engaging them with the said connected parts, and a strap having a subsidiary connector part provided with stud means thereon for releasable connection with one of the aforesaid connector parts.

2. A strap connecting arrangement as set forth in claim 1, wherein the subsidiary connector part is provided with a stud transversely extending therefrom and the connector part with which it is to be connected is provided with a socket for releasably receiving said stud.

3. In a connecting arrangement for the strap ends of parachute harnesses and the like, the combination of a plurality of straps having connector parts thereon provided with openings therethrough, a coupling device provided with releasable detents for releasable disposition in the openings of said coupling device for connecting the straps together, at least one of said connector parts being provided with a reduced slot extending from its opening and in position to extend outwardly beyond the coupling device when said connector part is attached therewith, and another strap end having a subsidiary connecting part provided with a headed stud, said headed stud being of such dimensions that its head may be inserted and withdrawn with respect to the detent receiving opening of the connector part upon which it is to be placed so that the stud inwardly of said head can be slid along the slot of said connector part, the head of said connector part being of a dimension not permitting of its being released from said slot transversely.

4. In a connector device for connecting the strap ends of a parachute harness or the like to a coupling device, the combination of a plurality of strap ends having connector parts thereon, said coupling device having releasable detents thereon, said connector parts having openings for receiving the detents so that the openings of said connector parts lie within the coupling when the connector parts are connected to the coupling, another strap having a subsidiary connecting part provided with a laterally extending stud releasably connected with a connector part so that when the said connector part is connected to the coupling the said stud will be prevented from release with respect to said connector part.

5. In a parachute harness coupling structure the combination of a parachute harness having a plurality of straps provided with connector parts thereon, a parachute pack having a pair of belt straps connected therewith, and a coupling device having means for connecting one of the belt straps thereto and having releasable detents for releasable connection with the connector parts of the straps of the harness, the other belt strap having a subsidiary connecting part connected thereon, and means for releasably connecting said subsidiary connecting part to one of the connecting parts of the harness.

6. A connecting arrangement for the straps of parachute harnesses and packs as defined in claim 5 in which the connector parts of the harness are provided with openings for receiving the detents of the coupling, the connector part to which the subsidiary connecting part is connected having a slot extending to and communicating with its opening and being of less transverse dimension than the diameter of said opening, the subsidiary part having a headed stud for releasable connection in said slot, the head of the stud being such that it may be moved into and out of the opening of said connector part but not the slot, said connector part when attached to the coupling being so arranged thereon that only the slot portion thereof extends beyond the confines of the coupling.

7. In a connector device for connecting the straps of parachute harnesses and packs, the combination of a parachute harness having straps provided with connector parts thereon, a pack having belt straps connected therewith, a quick release coupling connected to one of the belt straps, said coupling having releasable detents thereon, the connector parts of the harness having openings for releasable connection with the detents of the coupling, the other belt strap having a subsidiary connector part, and means on said combination of a parachute harness having straps subsidiary connector part and one of the connector parts of the parachute harness for releasable connection of them to each other.

8. A connecting arrangement for parachute and pack harnesses as defined in claim 7 wherein the connector part to which the subsidiary connector part is releasably connected is provided with a slot extending to and connected with the detent opening therein and which slot is of less width than the diameter of said opening, the subsidiary coupling part being provided with a headed stud for releasable connection in the said slot and opening of the connector part, the head being of such dimension that it may pass into and out of the opening of the connector part but not transversely of the slot.

9. In a parachute harness connecting arrangement the combination of a parachute harness having strap ends and connector parts thereon, a coupling device having detent means for releasable connection with the connector parts, a subsidiary connector part having a stud with a reduced shank and an enlarged end head thereon, one of the connector parts having a key-hole type slot therein, the slotted portion of which is adapted to receive the shank of the stud, the head of the stud being of such size that it may pass transversely through the larger opening of the connector part but not through the slot portion.

JOHN EDWARD HATFIELD.

References Cited in the file of this patent

UNITED STATES PATENTS

| Number | Name | Date |
|---|---|---|
| 2,255,258 | Lethern | Sept. 9, 1941 |
| 2,495,381 | Moran | Jan. 24, 1950 |

FOREIGN PATENTS

| Number | Country | Date |
|---|---|---|
| 771,397 | France | July 23, 1934 |
| 774,248 | France | Sept. 17, 1934 |